(12) United States Patent
Chang

(10) Patent No.: US 6,380,510 B1
(45) Date of Patent: Apr. 30, 2002

(54) UNIVERSAL HOLDING AND ALIGNMENT FIXTURE FOR BELLOWS WELDING

(75) Inventor: Dale U. Chang, Orlando, FL (US)

(73) Assignee: Laser Applications, Inc., Orlando, FL (US)

( * ) Notice: Subject to any disclaimer, the term of this patent is extended or adjusted under 35 U.S.C. 154(b) by 0 days.

(21) Appl. No.: 09/596,511

(22) Filed: Jun. 19, 2000

Related U.S. Application Data

(63) Continuation-in-part of application No. 08/921,291, filed on Aug. 29, 1997, now Pat. No. 6,078,021.

(51) Int. Cl.[7] ............................................. B23K 26/28
(52) U.S. Cl. ..................... 219/121.63; 29/454; 228/212
(58) Field of Search ................................ 228/4.1, 44.3, 228/49.4, 212; 29/454; 219/121.63, 121.64

(56) References Cited

U.S. PATENT DOCUMENTS

| | | | | |
|---|---|---|---|---|
| 2,347,185 A | * | 4/1944 | Feutress | |
| 3,666,161 A | * | 5/1972 | Keller | 228/44.3 |
| 3,764,127 A | * | 10/1973 | Keller | 29/454 |
| 4,218,006 A | * | 8/1980 | Atrepiev et al. | 228/44.3 |
| 4,358,658 A | * | 11/1982 | Van Blarigan et al. | 219/121.63 |
| 4,496,097 A | * | 6/1985 | Larsen | 228/212 |
| 4,760,236 A | * | 7/1988 | Stoll | 219/121.63 |
| 5,410,123 A | * | 4/1995 | Rancourt | 219/121.63 |

* cited by examiner

Primary Examiner—Geoffrey S. Evans
(74) Attorney, Agent, or Firm—Allen, Dyer, Doppelt, Milbrath & Gilchrist, P.A.

(57) ABSTRACT

Method and apparatus for welding the inside diameter and the outside diameter of bellows diaphragms for forming a bellows without using chill rings or spacers. This universal welding fixture consists of at least one drive wheel and at least one idler wheel for holding and aligning different size bellows diaphragms. A concentrated heat source such as a laser beam is applied at the edge for joining diaphragms together.

20 Claims, 9 Drawing Sheets

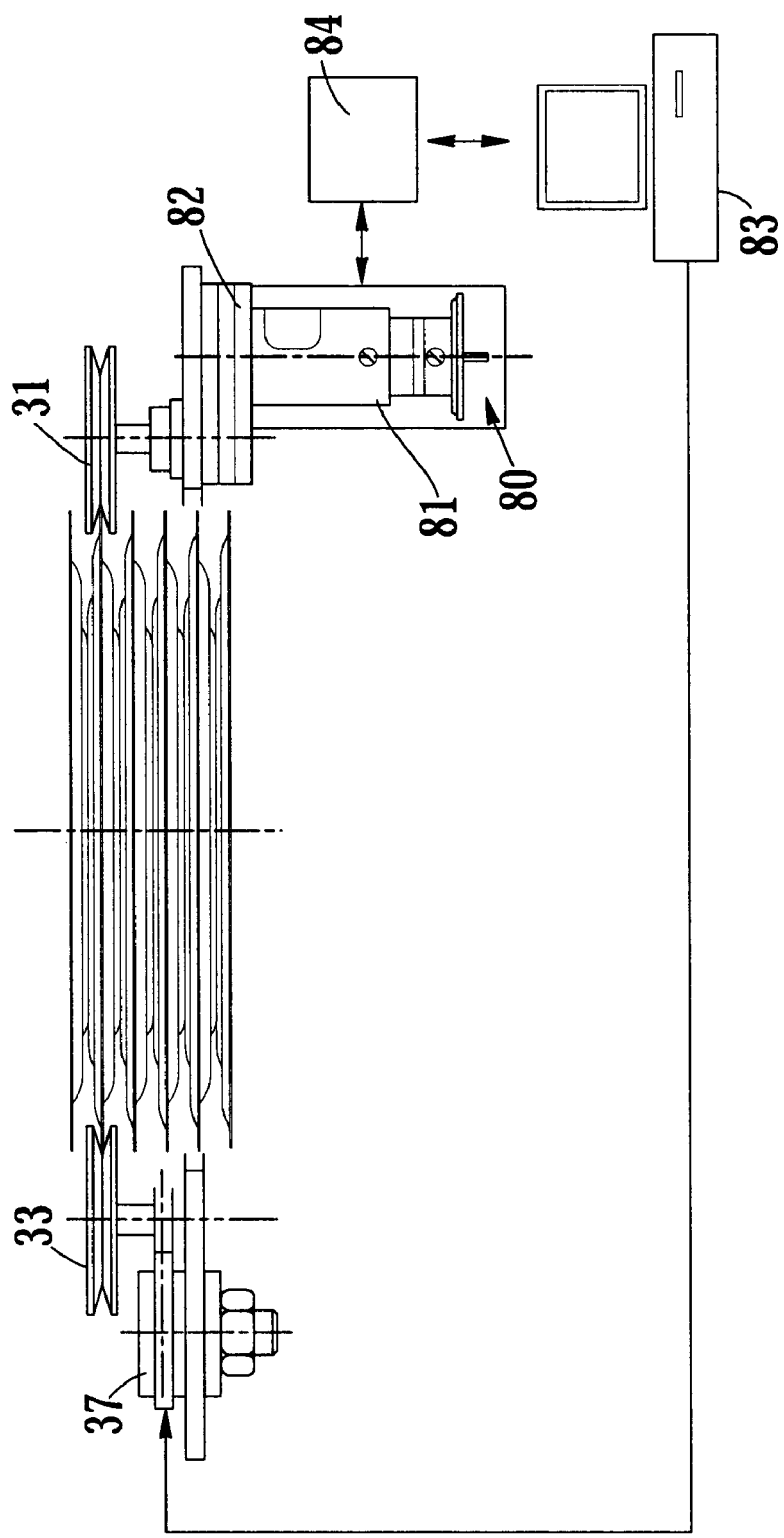

UNIVERSAL HOLDING AND ALIGNMENT FIXTURE FOR BELLOWS WELDING

SPECIFIC DATA RELATED TO THE INVENTION

This application is a continuation-in-part of patent application, U.S. Ser. No. 08/921,291 filed Aug. 29, 1997, now U.S. Pat. No. 6,078,021.

FIELD OF THE INVENTION

The present invention relates to manufacturing of metal bellows, and, more particularly, to an apparatus and method for welding metal bellows.

BACKGROUND OF THE INVENTION

Precision metal bellows are widely used in a number of applications where movement is required, but where sealing is also desired. For example, a bellows may seal a vacuum tightly while acting as a mechanical actuator.

A bellows may be formed by joining together a series of bellows diaphragms in a predetermined pattern. A typical diaphragm is a generally circular disk with concentric folds formed therein. The diaphragms are joined together so that alternate adjacent inside edges are connected together and alternate adjacent outside edges are connected.

The conventional approach to joining metal diaphragms has been to tungsten inert gas (TIG) weld both the inside and outside joints. A weld clamp is used to clamp the inside edges of the diaphragms for welding, and a chill ring or a spacer is used to press the outside edges of the diaphragms together for joining. Unfortunately, the TIG welding is relatively slow and may produce inconsistent quality welds. Conventional welding is described in more detail in U.S. Pat. No. 6,078,021, which patent also describes an improved apparatus and method for bellows welding by applying a laser and a seam tracking technologies.

Even though the apparatus and method of the '021 patent have improved the bellows welding greatly, there still exists areas of improvements needed to make the bellows welding process more economical. The laser welding that is described in U.S. Pat. No. 6,078,021 improved productivity substantially, but still requires precision copper chill rings or spacers for the outside welding. These spacers are needed to press the diaphragms together for effective welding. For the inside welding, different weld clamps are needed for different sizes of the diaphragms.

U.S. Pat. No. 3,918,622 to Larsen discloses tungsten inert gas welding of the outer joint of a plurality of stacked diaphragms in a rotatable arbor. Since the arbor is made to hold a certain size of diaphragms, many different sizes of arbors are needed to weld variety of diaphragms. Unfortunately, this process has the same problem of high investment in welding fixtures as in the case of conventional welding processes.

Also relating to joining diaphragms to form a metal bellows, U.S. Pat. No. 3,626,582 to Melill discloses diffusion bonding of stacked diaphragms. The fabrication requires pressuring fixture tooling including an external steel cylindrical retainer ring and an internal steel cylindrical retainer plug, together with a force transmitting annular ram and multiple thin steel pressure support rings using to transmit the bonding force of the high pressure ram. The process, unfortunately, is relatively complicated and expensive as it requires elevated temperature operation. Beside, many different sizes of fixtures are needed to braze different size diaphragms.

Stoll in U.S. Pat. No. 4,760,236 discloses a tubular rotating fixture for welding outer and inner seams of annular elements. Unfortunately, the holding fixture is not readily adaptable for different sizes of annular element (diaphragm), and many different sizes of the holding fixtures are needed to weld different size of bellows.

Rancourt discloses an apparatus for welding multiple joints simultaneously in U.S. Pat. No. 5,410,123. An electron beam or laser beam is impinged on a multiple and separate joints to weld. The idea lacks the practicality since majority of the welding power is lost through the spaces between the joints, and only a fraction of the power will be used to weld. Moreover, the power density in this arrangement will not be high enough to initiate welding.

Landtwing, U.S. Pat. No. 5,053,601, discloses a process of stamping and welding in the same stamping press. Even though the idea appears to be economical since you do not move parts around, uncleaned stamped parts will produce defects in welding. This process is not suited for precision welding of thin gage diaphragms for bellows.

SUMMARY OF THE INVENTION

Among the several features and advantages of the present invention may be noted the provision of an apparatus and related methods for forming a precision weld at the interior and exterior joints of a metal bellows without the use of expensive chill rings or spacers; minimization of tooling costs of different weld clamps and arbors that are needed in conventional welding of bellows; and the provision of a universal welding fixture for welding different sizes of diaphragms to reduce the manufacturing costs of making a metal bellows.

These and other objects, advantages and features of the present invention are provided by an apparatus for welding the inner and outer joints of a bellows. The apparatus preferably includes three guide wheels for holding and aligning diaphragms to be welded. The guide wheels have V-grooves on their rims to capture and hold the two edges of the adjacent diaphragms for welding. The three guide wheels may be placed at the outside periphery of the diaphragm for outside diameter welding, and may be placed inside the diaphragm opening for inside diameter welding.

One of the wheels is preferably an idler wheel and is attached to a spring-loaded rotary solenoid that may be swung away form the diaphragms for loading and unloading of diaphragms, convolutions and bellows. The idler wheel, when in contact with the diaphragms, pushes the diaphragms against the other two guide wheels for holding and aligning the diaphragm edges. The rotary solenoid may be secured at a different position with respect to the other two guide wheels to accommodate different diameter diaphragms. One or both of the guide wheels may be driven by an electric motor with a gear reduction box to rotate the wheels at a relatively slow speed. The speed and the direction of the electric motor rotation may be controlled by a microprocessor in a personal computer for proper welding.

The heat source for the welding may be an electric arc such as typical tungsten inert gas (TIG), or a laser as described in U.S. Pat. No. 6,078,021. Other types of heat sources including conventional welding sources as well as more esoteric sources, such as an electron beam or plasma, may be used with this apparatus for welding of bellows without departing from the invention. The term "heat source" thus refers to any suitable welding apparatus for applying concentrated heat to the metal bellows at sufficient intensity to effect melding and welding thereof.

BRIEF DESCRIPTION OF THE DRAWINGS

For a better understanding of the present invention, reference may be had to the following detailed description taken in conjunction with the accompanying drawings in which:

FIG. 8 shows one example of drive train for rotating the guide wheel in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Sizes and thickness may be exaggerated for clarity.

The terms "diaphragm", "convolution", and "segment" are used herein as follows: diaphragm refers to a thin gage stamping in the shape of an annulus and with or without formed bends. Typically a male diaphragm and a female diaphragm are welded together to form a convolution. In other words, a convolution is a joined pair of diaphragms. Similarly, a segment is one or more joined convolutions, and a plurality of joined segments may define a metal bellows.

The term "edge welding" is used herein to refer to a welding process where either a pair of adjacent outer edge surfaces or inner edge surfaces are exposed to the welding heat source to melt both edges for joining. This term is used in contrast to "melt-thru welding" where one surface melts first and the second surface melts afterwards to form a joint. In the case of edge welding, the welding beam direction is generally parallel to the mating surface to be joined, while in melt-thru welding the welding beam is generally perpendicular to the mating surface, although in either case the weld beam may be angularly oriented to the melting surface.

Figure 1:
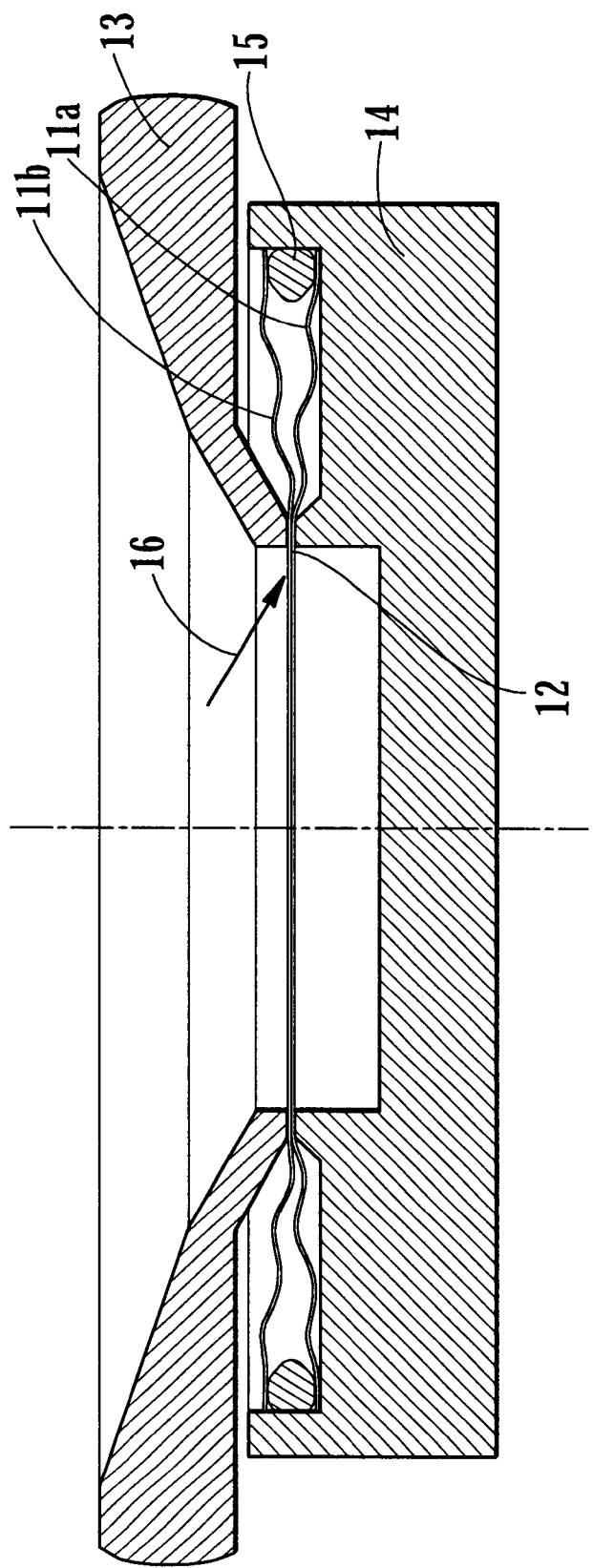
FIG. 1 is a conventional bellows ID welding fixture. Different welding fixtures are needed to clamp diaphragms of different inside diameters.

Referring now initially to FIG. 1, a conventional method of holding two diaphragms, male diaphragm 11a and female diaphragm 11b, for welding the inner joint 12 of the pair of diaphragms 11a and 11b to form a convolution is shown. An upper weld clamp 13 and a lower weld clamp 14 are used to clamp the inside edges of the two diaphragms 11a and 11b.

It will be apparent from FIG. 1 that different weld clamps are needed to weld different sizes of diaphragms, which incurs a high tooling investment costs. Moreover, matching weld clamps need to be installed in the welding machine to weld different sizes of diaphragms. This tool changeover causes production interruption.

Typically, a chill ring or spacer 15 is placed between the peripheral edges of the diaphragms 11a and 11b. The chill ring or spacer 15 is further described in U.S. Pat. No. 6,078,021.

To effect the welding, a concentrated heat source indicated by arrow 16 is applied to the edge 12 to fuse the two edges of the diaphragms 11a and 11b together. This procedure is called ID (inside diameter) welding. The two diaphragms that are joined together on the inside diameters form a convolution 21.

Figure 2:
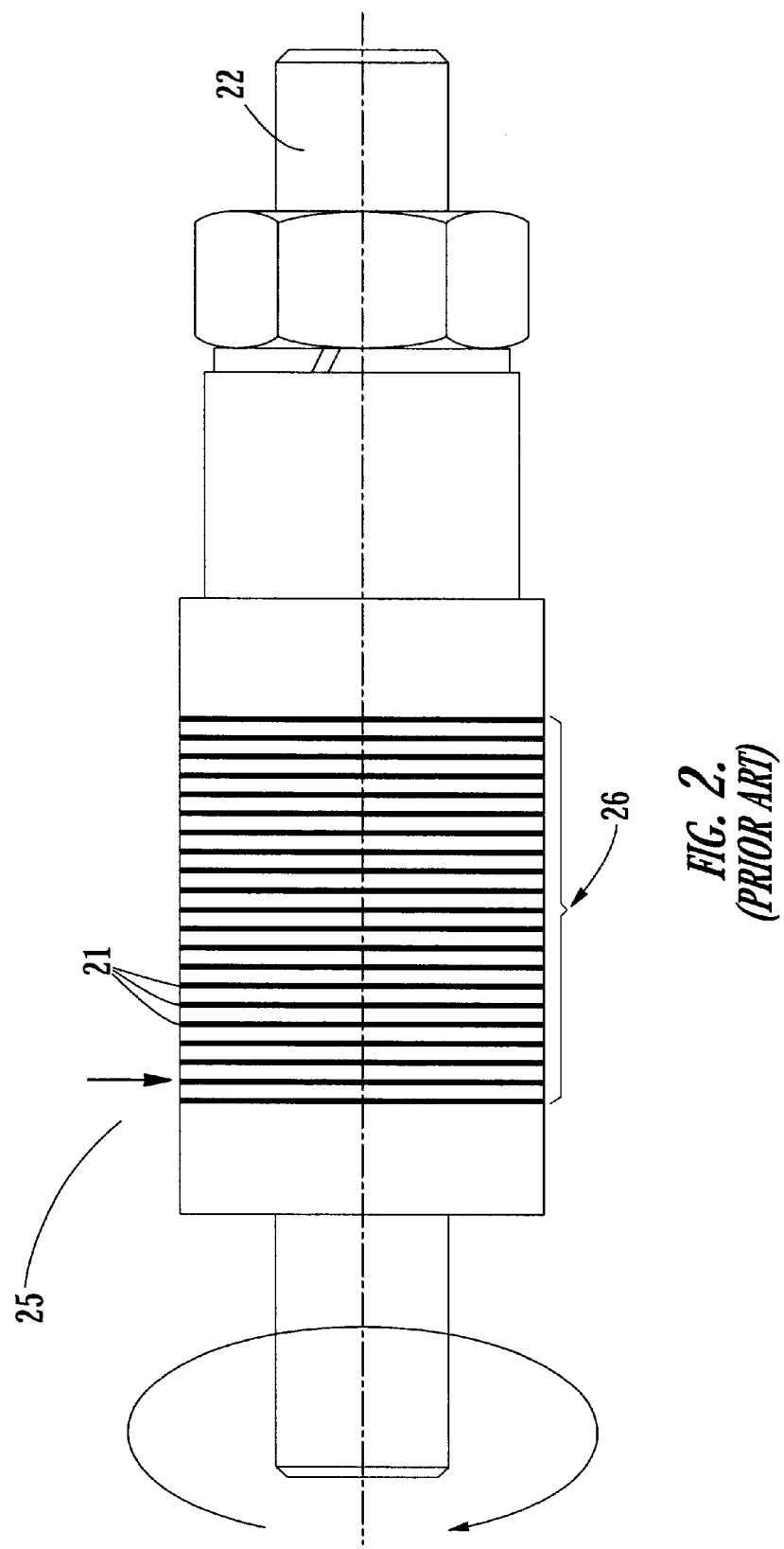
FIG. 2 is a conventional bellows OD welding fixture. Different sizes of spacers and arbors are needed to hold different sizes of diaphragm.

As shown in FIGS. 2 and 2A, a plurality of convolutions 21 are stacked together on an arbor 22 for welding of the outside diameter edges 23 and 24 of the diaphragms 11a and 11b. A concentrated heat source indicated by arrow 25 is applied to the edges 23 and 24 to fuse the two edges of the convolutions to effect the welding. This procedure is called OD (outside diameter) welding.

After welding is completed, the bellows (or the segment) 26 is removed from the arbor 22, and the spacers 15 are removed from the bellows 26. Sometimes, spacers are used over again, but often times these spacers are consumable item and may not be used again due to the deformation of the spacer during the removal process. Since the spacers should maintain precise dimensions for a precision welding, they are expensive. Moreover, different size bellows require matching spacers, which incur a high tooling investment.

The present invention is designed to eliminate the costly spacers (chill rings) 15 and the high investment costs of weld clamps such as clamps 13, 14 and arbors 22. The invention is also designed to eliminate the cumbersome and time-consuming tool changeover for welding different sizes bellows.

Figure 3:
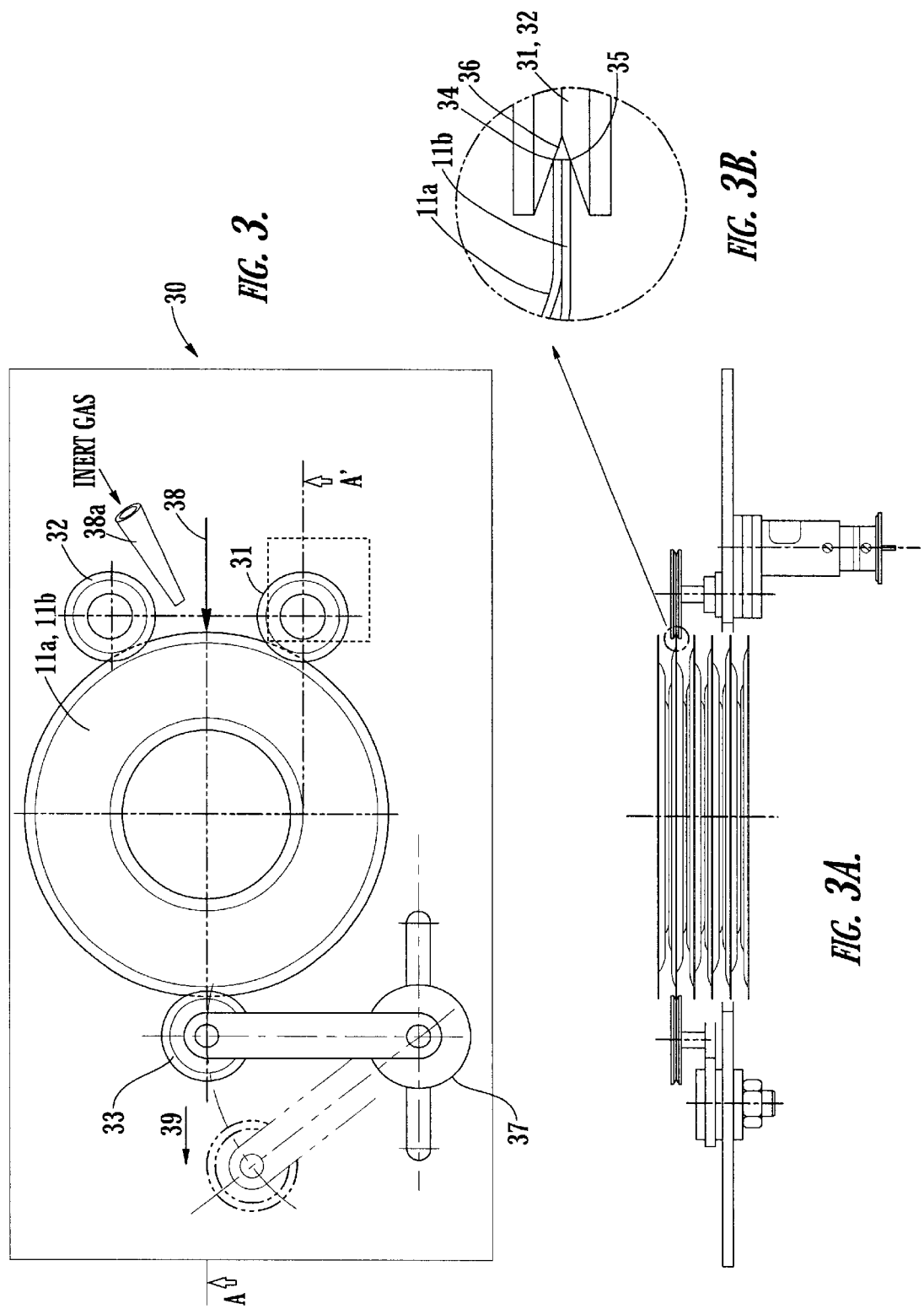
FIG. 3 is the new apparatus for holding and aligning diaphragms for OD welding in accordance with the present invention.

FIG. 3 is a simplified plan view and FIG. 3A is a simplified elevation view of one embodiment of an apparatus 30 incorporating the teachings of this invention. A driver guide wheel 31, a stationary guide wheel 32 and an idler guide wheel 33 hold and align the diaphragms 11a and 11b for welding. The outer edges 34 and 35 of the adjacent diaphragms 11a and 11b are squeezed into a V-groove 36 of guide wheel 31 (see FIG. 3B) by the pressure from the idler guide wheel 33. Other guide wheels 32 and 33 have the same V-groove 36 to hold and align the diaphragm edges 34 and 35 for holding and alignment. While a V-shaped groove is preferred, it will be recognized that any shape that imparts a compressive force onto adjacent diaphragms could be used.

A concentrated heat source indicated by arrow 38 is applied to fuse the two edges 34 and 35 to effect the welding. The welding may be done in the form of "edge welding" or "melt-thru welding", even though edge welding is generally preferred in bellows welding. The concentrated heat source hereinafter is referred to a laser beam, an electron beam, or an electric arc. The laser beam may be Nd;YAG, diode, $CO_2$, or any other high intensity beams. The electric arc may be gas tungsten arc (TIG), plasma, micro-plasma, or any other concentrated arc. The arc heat may be delivered to the weld area through a welding torch. Electron beams may be high vacuum electron beam or soft-vacuum electron beam.

An inert gas shielding may be provided to the weld area to prevent the weld from oxidation. The entire weld area may be flooded with inert gas or a nozzle 38a may be used to locally shield the weld area. In the subsequent drawings, the inert gas shielding is deleted for clarity of the other aspects of the apparatus, but it is the intention of this invention to provide inert gas shielding where the weld is made.

For positive traction, the two guide wheels 31 and 32 are preferably rotated at the same speed and direction by an electric motor. The idler wheel 33 may be attached to a spring-loaded rotary solenoid 37 to swing the idler wheel 33 in the direction 39 to load the diaphragms 11a and 11b, and to remove the bellows from the apparatus 30 after the welding is complete. A spring-loaded linear solenoid may also be used for the same purpose.

Figure 4:
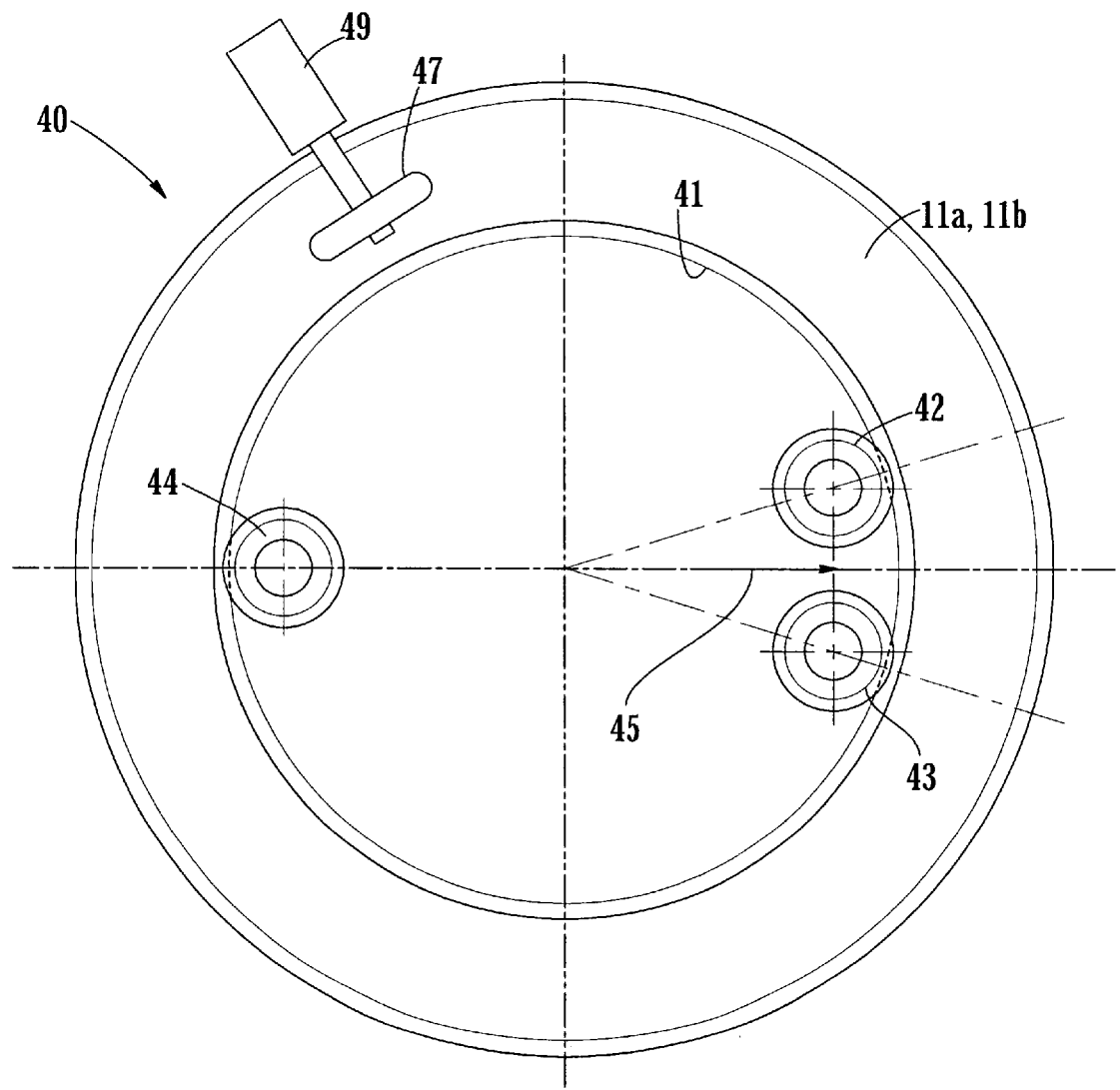
FIG. 4 is the new apparatus for holding and aligning diaphragms for ID welding in accordance with the present invention.

Turning to FIG. 4, for ID welding of the inside diameter edges 41 of the diaphragms 11a and 11b, three V-grooved guide wheels 42, 43, and 44 may be used. A concentrated heat source 45 is applied to the edge 41 to effect the ID welding. At least one of the three wheels 42, 43 and 44 may be a driving wheel to rotate the diaphragms 11a and 11b. For a positive traction, two guide wheels may be rotated at the same speed and direction by an electric motor. Alternatively, as shown in FIG. 4, all the wheels engaging the edges of the diaphragms may be idler wheels and the driving force supplied by a friction drive wheel 47 engaging a diaphragm surface and driven by a motor 49.

Figure 5:
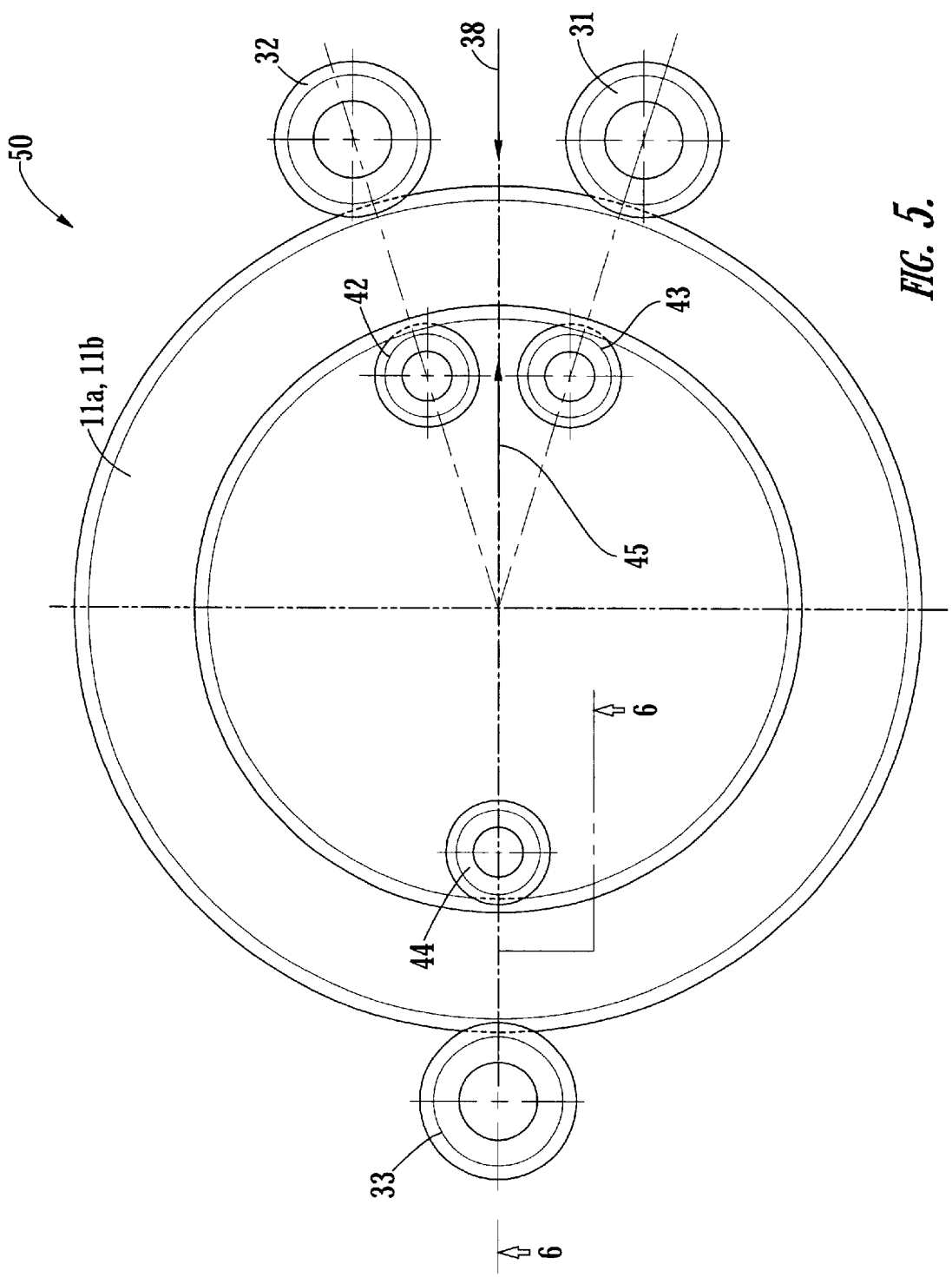
FIG. 5 is a universal center-less holding and rotating mechanism for bellows welding in accordance with the present invention.

FIG. 5 shows an apparatus 50 that combines the apparatus 30 shown in FIG. 3 and the apparatus 40 in FIG. 4. The apparatus 50 forms a universal holding and aligning fixture for bellows welding. The ID (inside diameter) welding as well as the OD (outside diameter) welding may be performed alternately or simultaneously with apparatus 50. Three guide wheels, 31, 32, and 33 are used for holding and aligning the diaphragms 11a and 11b for OD welding, and the other three guide wheels, 42, 43, and 44 are used for ID welding. Two concentrated heat sources 38 and 45 may be used to weld both the inside edges and the outside edges simultaneously or alternately. The guide wheels 33, 42, 43, and 44 may all be spring-loaded to hold the diaphragms 11a and 11b securely in the guide wheel grooves. Further, the guide wheels 33, 42 and 43 may be mounted on one support while guide wheels 44, 31 and 32 are mounted to another support.

Figure 6:
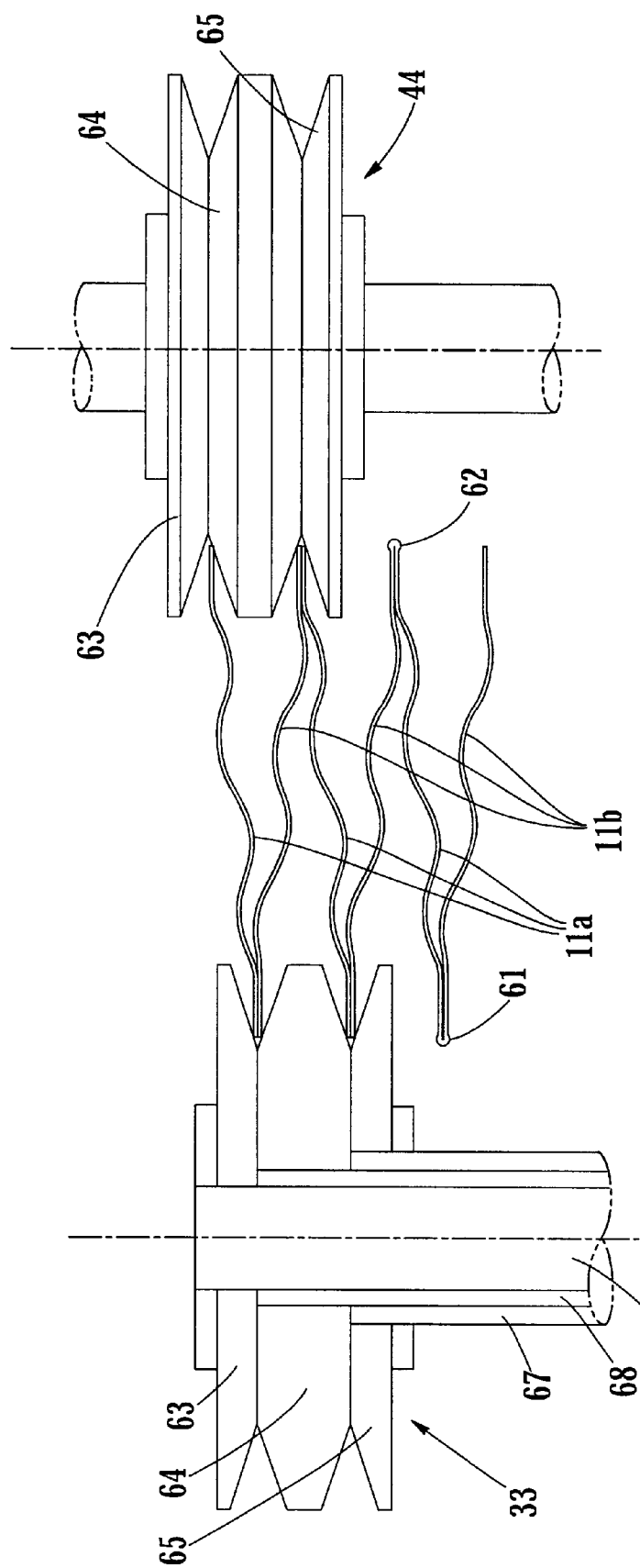
FIG. 6 shows close-up of the holding and aligning guide wheels in accordance with the present invention.

FIG. 6 is a cross-sectional view taken along line 6—6 in FIG. 5 to show the shapes of the V-grooved guide wheels 33 and 44 and the fit of the diaphragm convolutions in the wheels. Other guide wheels 31, 32, 42, and 43 may have generally the same shape except the diameters may be different. ID weld 62 and OD weld 61 are also shown. The V-grooved guide wheels 42, 43, and 44 may be made of a single piece or may be composed of three separate disks 63, 64, and 65 to form a sharp V-groove. As shown on the left side of FIG. 6, disks 63, 64, and 65 may be mounted on separate coaxial tubes 67, 68, 69 respectively so that they may move up and down individually to seat and clamp diaphragms more effectively. The same multiple disk construction may be used for wheel 44 as indicated by duplicate reference numbers 63, 64, 65.

The materials of the guide wheel may be hardened steels such as tool steels to reduce the wear caused by diaphragm edges. The materials may be heat source treated, carburized, nitrided or may be coated with a special hard material for high surface hardness, typically in the range of more than Rockwell C of 40. The hard coating technology is well documented in the cutting tool industry, and will not be covered in this disclosure. One example of the coating is "TiN" or titanium nitride coating. Hard ceramics are another candidate materials for the guide wheels.

Figure 7:
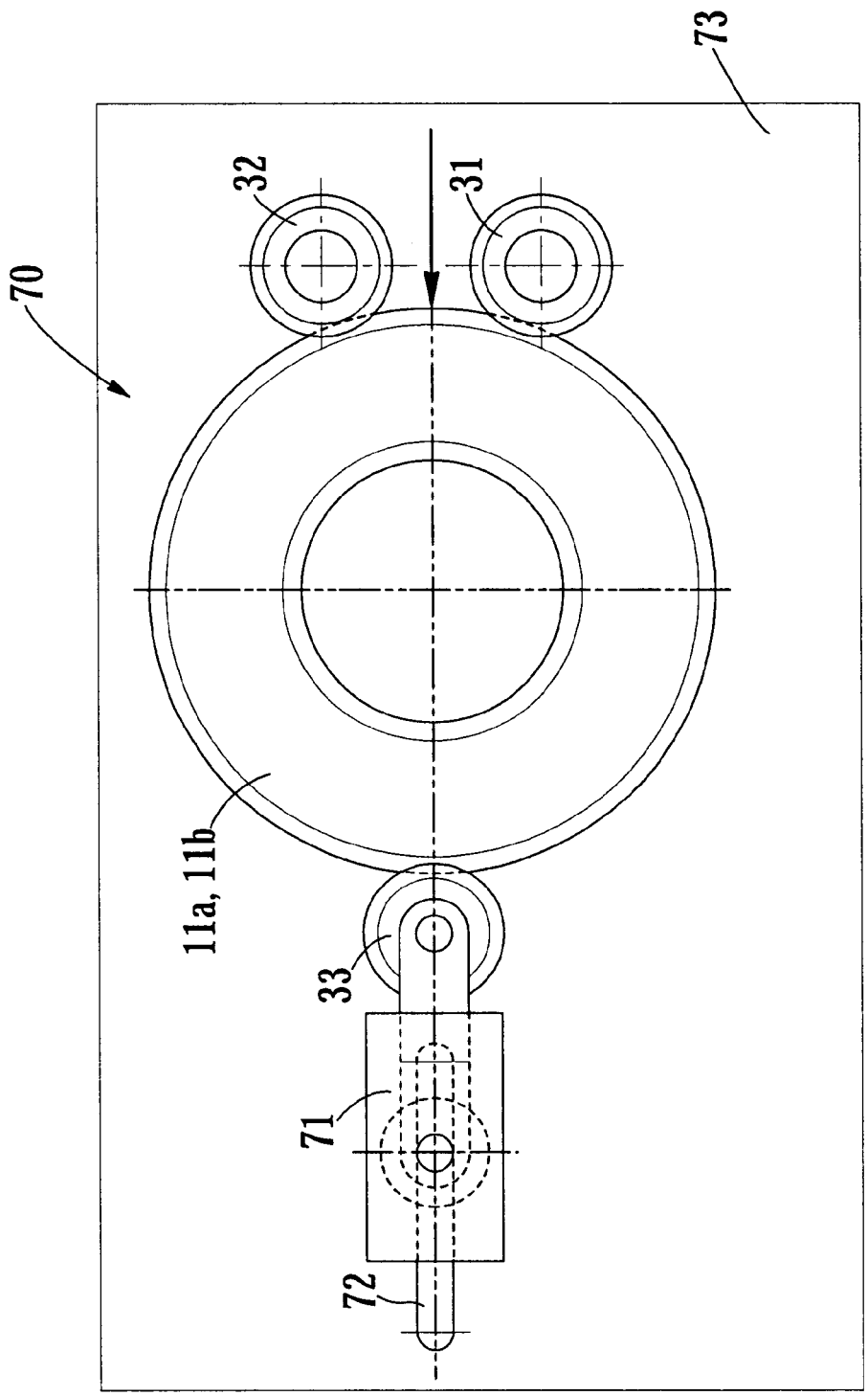
FIG. 7 shows one example method of mounting idling wheel in accordance with the present invention.

FIG. 7 shows a spring-loaded linear solenoid 71 mounted in a slot 72 on a base plate 73. This arrangement allows the apparatus 70 to accept different sizes of the diaphragms 11a and 11b. The slot may be replaced with a series of mounting holes to vary the position of the guide wheels. The solenoid 71 may have a spring mechanism inside so that the idler wheel 33 may exert some pushing force to the diaphragms 11a and 11b against the opposing guide wheels 31 and 32 to secure the position of the two diaphragms 11a and 11b.

FIG. 8 shows one example of a drive train 80 coupled to the driver guide wheel 31. An electric motor 81 with a reduction gear box 82 may be used to drive the V-grooved guide wheel 31. Other arrangement such as a belt and pulley may be used to rotate the wheel 31. A computer 83 may be used to control the speed and the direction of the rotation.

Figure 9A:
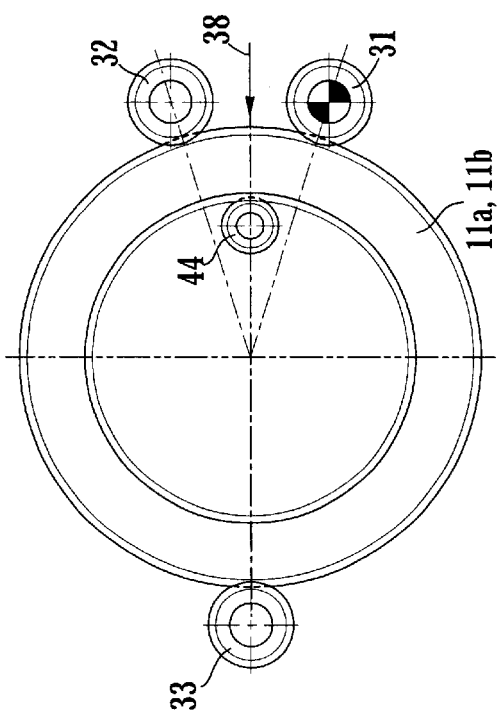
FIG. 9 shows a few examples of guide wheels combinations according to this invention.
Figure 9B:
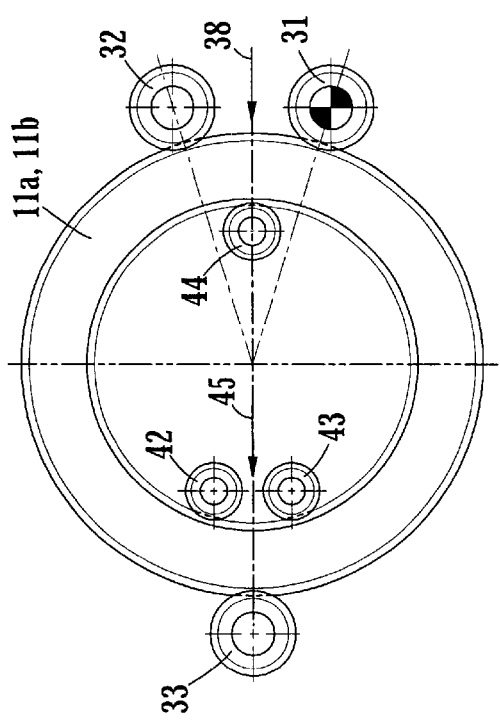
Figure 9C:
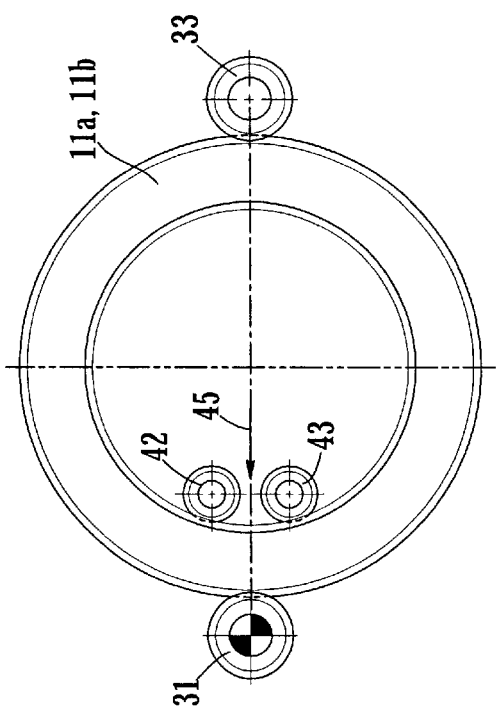

Other types of drive mechanisms are also contemplated by the present invention as would be readily understood by those skilled in the art. The mechanisms shown in the figures may be positioned horizontally or vertically. For example, FIGS. 9a–9c illustrate variations and combinations of the guide wheels and the direction of the welding beam for bellows welding. FIG. 9-(a) shows a universal fixture for ID welding and OD welding of bellows diaphragms. FIG. 9-(B) is a fixture for OD welding, and FIG. 9-(c) may be used for ID welding of bellows diaphragms. In all cases, at least one guide wheel (31 for example) is a driver. Furthermore, it is possible to construct the apparatus using only two wheels, for example, the drive wheel 31 and idler wheel 33 if the convolution is otherwise supported.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

That which is claimed is:

1. An apparatus for enabling welding of joint between a pair of adjacent metal diaphragms, each of the diaphragms comprising a generally circular plate having a central opening, the apparatus comprising:

a first drive wheel having a groove formed circumferentially thereabout, the groove being sized to engage and compress first adjacent edges of the pair of diaphragms against one another; and a first idler wheel positioned to also engage the first edges of the pair of diaphragms and positioned for exerting a force on the diaphragms in a direction to urge the diaphragms into the groove in the first drive wheel, wherein the diaphragms are fixed in compressive contact about the first adjacent edges to enable welding thereof.

2. The apparatus of claim 1 wherein the diaphragms are rotated for welding by a driving force exerted through the first drive wheel.

3. The apparatus of claim 2 and including a second drive wheel positioned in spaced relationship from said first drive wheel, the second drive wheel having a groove for engaging and compressing the first adjacent edges of the pair of diaphragms.

4. The apparatus of claim 3 wherein edge welding of the compressed edges of the pair of diaphragms occurs between the first and second wheels.

5. The apparatus of claim 3 wherein the idler wheel includes a circumferential groove for receiving the first adjacent edges of the pair of diaphragms.

6. The apparatus of claim 5 wherein the first adjacent edges are along an outer diameter of the pair of diaphragms.

7. The apparatus of claim 5 wherein the first adjacent edges are along an inner diameter of the pair of diaphragms.

8. The apparatus of claim 3 wherein the first adjacent edges are along an outer diameter of the pair of diaphragms and the apparatus further includes a third drive wheel having a circumferential groove adapted for engaging and compressing second adjacent edges along an inner diameter of the pair of diaphragms and a second idler wheel for engaging the second adjacent edges in a manner to urge the second adjacent edges into the groove of the third drive wheel.

9. The apparatus of claim 3 wherein the first idler wheel comprises a plurality of stacked annular members, each of the annular members being connected to a corresponding one of a plurality of telescoping shafts, and wherein the shafts are slidably positionable with respect to each other to bring the annular members into contact to form the grooved idler wheel and to further separate the members to release the diaphragms.

10. The apparatus of claim 1 wherein the diaphragms are edge welded by application of a welding source to each of the first adjacent edges concurrently.

11. The apparatus of claim 10 wherein the welding source is a laser.

12. An apparatus for enabling welding of joint between a pair of adjacent metal diaphragms, each of the diaphragms comprising a generally circular plate having a central opening, the apparatus comprising:

a first drive wheel having a groove formed circumferentially thereabout, the groove being sized to engage and compress first adjacent edges of the pair of diaphragms against one another;

a second drive wheel positioned in spaced relationship from said first drive wheel, the second drive wheel having a groove for engaging and compressing the first adjacent edges of the pair of diaphragms; and a first idler wheel positioned to also engage the first edges of the pair of diaphragms and positioned for exerting a force on the diaphragms in a direction to urge the diaphragms into the groove in the first and second drive wheels, wherein the diaphragms are fixed in compressive contact about the first adjacent edges to enable welding thereof.

13. The apparatus of claim 12 wherein edge welding of the compressed edges of the pair of diaphragms occurs between the first and second wheels.

14. The apparatus of claim 12 wherein the idler wheel includes a circumferential groove for receiving the fist adjacent edges of the pair of diaphragms.

15. The apparatus of claim 12 wherein the first adjacent edges are along an outer diameter of the pair of diaphragms.

16. The apparatus of claim 12 wherein the first adjacent edges are along an inner diameter of the pair of diaphragms.

17. The apparatus of claim 12 wherein the first adjacent edges are along an outer diameter of the pair of diaphragms and the apparatus further includes a third drive wheel having a circumferential groove adapted for engaging and compressing second adjacent edges along an inner diameter of the pair of diaphragms and a second idler wheel for engaging the second adjacent edges in a manner to urge the second adjacent edges into the groove of the third drive wheel.

18. The apparatus of claim 12 wherein the first idler wheel comprises a plurality of stacked annular members, each of the annular members being connected to a corresponding one of a plurality of telescoping shafts, and wherein the shafts are slidably positionable with respect to each other to bring the annular members into contact to form the grooved idler wheel and to further separate the members to release the diaphragms.

19. The apparatus of claim 12 wherein the diaphragms are edge welded by application of a welding source to each of the first adjacent edges concurrently.

20. The apparatus of claim 12 wherein the welding source is a laser.

* * * * *